United States Patent [19]

Richter et al.

[11] 4,126,934

[45] Nov. 28, 1978

[54] METHOD FOR THE MANUFACTURE OF AN ELECTRODE FOR ELECTROCHEMICAL CELLS

[75] Inventors: Gerhard Richter; Konrad Mund; Ulrich Gebhardt; Raghavendra Rao, all of Erlangen, Germany

[73] Assignee: Siemens Aktiengesellschaft, Berlin and Munich, Germany

[21] Appl. No.: 545,404

[22] Filed: Jan. 30, 1975

[30] Foreign Application Priority Data

Feb. 5, 1974 [DE] Fed. Rep. of Germany ....... 2405475

[51] Int. Cl.$^2$ .............................. H01M 4/88
[52] U.S. Cl. ...................................... 29/623.1; 429/44
[58] Field of Search ...................... 136/86 D, 120 FC; 429/44; 29/623.1

[56] References Cited

U.S. PATENT DOCUMENTS

| 3,274,031 | 9/1966 | Maget et al. | 136/120 FC |
|---|---|---|---|
| 3,291,753 | 12/1966 | Thompson | 136/120 FC |
| 3,341,446 | 9/1967 | Vielstich et al. | 136/86 D |
| 3,428,490 | 2/1969 | Bravo et al. | 136/120 FC |
| 3,481,787 | 12/1969 | Adlhart | 136/120 FC |
| 3,515,595 | 6/1970 | Sanford | 136/120 FC |

FOREIGN PATENT DOCUMENTS

| 239,130 | 11/1958 | Australia | 136/86 D |
|---|---|---|---|
| 1,145,357 | 3/1969 | United Kingdom. | |

Primary Examiner—Donald L. Walton
Attorney, Agent, or Firm—Kenyon & Kenyon, Reilly, Carr & Chapin

[57] ABSTRACT

A method for the manufacture of electrodes for electrochemical cells, is provided in which a Raney rare-metal catalytic layer is disposed on a metallic support structure in layer form. According to the invention, the Raney rare-metal catalytic layer is prepared by dissolving the inactive component of a layer, disposed on the support structure, of a homogeneous alloy of at least one of the metals of the platinum group of the periodic system of the elements as the active component and at least one of the metals of the iron group of the periodic system of the elements as the inactive component; the content of inactive component being at least 65 atompercent.

20 Claims, 3 Drawing Figures

METHOD FOR THE MANUFACTURE OF AN ELECTRODE FOR ELECTROCHEMICAL CELLS

BACKGROUND OF THE INVENTION

The invention concerns a method for the manufacture of an electrode for electrochemical cells with a Raney rare-metal catalytic layer disposed on a metallic support structure in layer form and the electrodes made thereby.

Electrodes for electrochemical reactions with rare-metal catalysts, e.g., platinum black or Raney platinum, have a high activity. The rare-metals are usually also termed as noble metals. For preparing such electrodes, the active metal can be precipitated from a solution on a sheet of metal, e.g., in the manufacture of a platinized platinum electrode. However, the active metal can also be bonded to a contact screen, say, of tantalum or platinum, by a binder, such as, polytetrafluoroethylene Raney platinum, which is prepared from a platinum-aluminum alloy, can be processed into electrodes by means of pressing with gold powder or by means of a binder. Another method for the manufacture of electrodes for electrochemical cells is also known, in which a Raney rare-metal catalytic layer is prepared on a metallic support structure in layer form wherein the inactive alloy component are specifically aluminum and tin (see German Auslegeschrift No. 1,172,650).

Although such electrodes have proven themselves useful in conventional fuel cells, they are relatively thick, at least several tenths of a millimeter, and are not particularly useful in various applications, particularly in biofuel cells, where it is necessary to use thinner electrodes, i.e., electrodes with a thickness of about 0.1 mm or less. Such electrodes, however, cannot be made by known methods since the alloys used heretofore for the manufacture of the Raney metals have unfavorable mechanical properties, particularly they are very brittle. They can therefore not be processed into thin layers. Thus, the alloy $PtAl_4$, for instance, which is most used, exhibits a low mechanical load capacity and it breaks very quickly in bending tests.

For thin and small electrodes it is furthermore necessary that they exhibit increased activity, so that a large output can be generated in a volume as small as possible. In the electrodes prepared by known methods, however, the content of binder has a detrimental effect. The activity basically available can be only partially utilized. On the other hand, electrodes pressed with gold are relatively heavy and are therefore not advantageous as far as the output per unit weight is concerned. Electrodes, which are not bonded either by gold or by other binders, lack the necessary mechanical stability. It has been found that known electrodes must further be improved with respect to efficiency and activity in order to be usable in biofuel cells.

SUMMARY OF THE INVENTION

It is therefore an object of this invention to provide a method for the manufacture of an electrode for electrochemical cells with a Raney rare-metal catalytic layer disposed on a metallic support structure in layer form which makes it possible to manufacture thin but nevertheless stable electrodes. The electrodes made by this method have increased activity, so that they are suited particularly for use in bio-fuel cells. According to the invention, this is achieved by the provision that the Raney rare-metal catalytic layer is prepared by dissolving out the inactive component from a layer, disposed on the support structure, of a homogeneous alloy of at least one of the metals of the platinum group of the periodic system of the elements as the active component and at least one of the metals of the iron group of the periodic system of the elements as the inactive component, having a content or inactive component of at least 65 atom-percent.

It is a further object of this invention to provide electrodes prepared by this method.

The metals of the platinum group of the periodic system of the elements are understood to be the metals ruthenium, rhodium, palladium, osmium, iridium and platinum. These metals are also termed in the specification and claims as platinum metals or the active component. The metals of the iron group of the periodic system of the elements as used herein are the metals iron, cobalt and nickel. These metals are also termed herein as iron metals or the inactive component. The platinum metals as well as the iron metals belong to the VIII subgroup of the elements of the Periodic System.

Contrary to the known methods for the manufacture of electrodes, alloys of platinum metals and iron metals serve as the starting materials in the method according to this invention for the manufacture of the electrodes or their catalytically active layers. Such alloys have the advantage over Raney alloys, such as platinum-aluminum alloys used heretofore in that they exhibit better mechanical properties. They are not brittle but are rather elastic and can therefore be bent and deformed as desired without breaking. Only such elastic alloys as these can be rolled into foils which are necessary for making thin electrodes.

Electrodes made according to this invention can be prepared having small thicknesses (down to 100 $\mu$m), high catalytic activity, great mechanical strength and good adhesion of the catalytic layer to the supporting electrode body, and in addition have the further advantage that they can catalyze the oxidation of glucose to a sufficient degree.

Electrodes made by the method according to the invention are therefore suited to particular advantage for use as anodes in bio-fuel cells, particularly in bio-fuel cells for operating an artificial heart.

Bio-fuel cells are understood here to be fuel cells which can be operated with substances of the body itself, particularly with glucose as the fuel. Bio-fuel cells such as glucose-oxygen cells, can serve as power sources for implanted electronic devices, e.g., heart pacers, i.e. cardiac pacemakers, or an artificial heart (see: Berichte der Bunsen-Gesellschaft fuer Physikalische Chemie vol. 77, No. 10/11, 1973, pages 787 to 790). Heart pacers require only about 100 $\mu$W of power. For the long-term supply of power to heart pacers it is satisfactory to implant the bio-fuel cell into the tissue, since the diffusion of glucose and oxygen from the body tissue is sufficient to supply the electrodes with the reactants. For this reason it is not absolutely necessary in this connection to use extremely small cells and therefore, very small and thin electrodes. The power requirements are increased by a factor of $10^5$, however, if bio-fuel cells are to be used to supply energy to an artificial heart. In order to ensure an adequate supply of the reactants, it is necessary in that case to arrange the bio-fuel cells in the blood stream. As such an energy source must generate the largest possible amount of power through the electrochemical oxidation of the glucose and the reduction of the oxygen from the blood in the smallest possible space, miniaturization is absolutely necessary. The bio-fuel cells used heretofore, in which an anode of active rare metal is arranged between two cathodes of activated carbon, however, still have a thickness of about 1 mm. The share of the anode, which may consist, for instance, of carbon impregnated with platinum and applied to a silver screen acting as a support frame is 400 μm alone. The electrodes are separated from each other and from the tissue by hydrophilic diaphragms. The necessary miniaturization must begin with the electrodes, it being particularly necessary also to use small, i.e., thin and yet highly active and mechanically stable electrodes for the oxidation of the fuel (anodes). These requirements are met in an advantageous manner by the electrodes manufactured in accordance with this invention.

The content of inactive component, i.e., of iron metal, of the alloy of platinum metal and iron metal used in the method according to the invention is preferably between 75 and 90 atom-percent. Such alloys yield, after activation, particularly active catalytic layers.

It is important in the method according to this invention that the alloys used are homogeneous, because only through the use of homogeneous alloys can the structure of the d-band, which is responsible for the catalytic activity, be changed over wide ranges, and the catalytic properties of the electrodes can be adapted better to the requirements for it.

In the method according to this invention, a platinum-nickel alloy is preferably employed. By using such alloy, electrodes can be manufactured which meet the requirements of electrodes to be used in bio-fuel cells particularly well.

A further advantage of the method according to this invention is seen in the fact that electrodes can also be made which contain not only pure platinum metals, but also mixtures of platinum metals in Raney form. In addition, the platinum metals used can advantageously be doped, i.e., other elements can be added to them. In the starting alloy, preferably 1 to 5 atom-percent and, in particular, about 3 atom-percent of the active component, i.e., the platinum metal, are replaced by at least one of the elements boron, silicon, titanium, zirconium, niobium and tantalum. To particular advantage, alloys are used in which 5 to 20 atom-percent and, in particular, about 15 atom-percent, of the active component is replaced by molybdenum and/or tungsten; or alloys in which 10 to 60 atom-percent in particular, about 40 atom-percent of the active component is replaced by copper and/or gold. The incorporation of these elements generates additional fault locations and active centers in the catalytic layer of the electrode and the surface is enlarged. These metals are incorporated into the catalytic layer predominantly in the form of oxides.

Electrodes with high catalytic activity for the glucose oxidation can advantageously be made by using a platinum-tungsten-nickel alloy.

For the manufacture of the electrode according to this invention, a homogeneous alloy of at least one of the metals of the platinum group and at least one of the metals of the iron group can advantageously be rolled into a thin foil and the iron metal dissolved out on at least one side of this foil superficially, maximally up to a depth of about 50 μm. This has the advantage that the support structure and the alloy layer consist of the same material and the preparation is thereby very simple. In addition, catalytic layers with different depths can be produced in a simple manner by this procedure through programmed activation. This results in a simple procedure to vary the catalytic activity of the electrodes.

Advantages are also obtained if in the manufacture of the electrodes a metal support layer, particularly platinum, is provided on at least one side with a thin alloy layer of at least one of the metals of the platinum group and at least one of the metals of the iron group and the iron metal is dissolved from this alloy layer. The activation, i.e., the dissolving of the inactive component, can be carried out very simply and easily, because it need not be monitored specially. The activation is completed when the inactive metal is dissolved from the alloy layer. It should be noted in this connection that, as is generally the case in the manufacture of Raney metals, the inactive component is not dissolved out completely and the active catalytic layer may still contain small quantities of the inactive component besides the active component. In the above procedure for the manufacture of the electrode according to the invention, it is impossible for the carrier to corrode under extreme conditions during the operation of an electrochemical cell containing this electrode, i.e. no further inactive component is dissolved out, as might be the case if a support structure consisting of the alloy is used.

For placing the alloy layer on the support structure, a foil of the proper alloy is preferably sintered or welded onto one or both sides of the metal layer.

The support structure can be provided with the alloy layer, in such a manner that a thin layer of at least one of the metals of the iron group is applied to a thin platinum metal foil by electrolytic precipitation or evaporation and the coated platinum metal foil is annealed at a temperature below the melting temperature of the alloy consisting of the platinum metal and the iron metal. Subsequently the iron metal is dissolved from the superficial alloy layer formed in this manner. Further, a thin layer of a mixture of at least one of the metals of the platinum group and at least one of the metals of the iron group can also be applied to a thin metal foil by plasma spraying, and this mixture can be homogenized by annealing; then the iron metal is again dissolved from the alloy formed in this manner.

The activation of the alloy, i.e., the dissolving of the inactive component, can be accomplished chemically as, for example, by etching with acids such as hydrochloric acid, sulfuric acid or nitric acid, or with acid mixtures. In chemical activation, the support structures provided with the alloy layer are treated, for instance, at room temperature, with an acid mixture of nitric acid and sulfuric acid. Through the dissolving of the inactive component, e.g., nickel, a black, active microporous layer is formed on the surface of the support structure. After about 15 minutes, the electrodes are removed from the acid and rinsed with water, keeping the active surface layer moist. Tests have shown that the alloy layers are attacked more at elevated temperatures. It can be seen under a microscope that, in electrodes which were activated at temperatures of about 50° C, the active layer has cracks and flakes-off after drying. However, stable surface layers are always obtained if the activation is performed at between about 20° and 40° C.

The activation is preferably accomplished, however, by electrochemical means. Here, the iron metal is dissolved out gently and without gas development, in a controlled manner. The active layers formed are not stressed in the activation and therefore adhere particularly well to the support structure. With this kind of activation, the depth of etching can also be controlled accurately, because the thickness of the active layers is determined by the length of the activation. In electrochemical activation, the electrodes are loaded in a non-oxidizing acid, particularly 1 m $H_2SO_4$, which is previously degassed with argon.

For electrochemical activation, galvanostatic, potentiostatic and potentiodynamic methods can be employed. The potentiodynamic method and the potentiostatic method have been found to be particularly well suited.

In the potentiodynamic method, the alloy is periodically and alternatingly oxidized and reduced in a potential range of between 0 and 1200 mV, as measured against the reversible hydrogen electrode in the same electrolyte. Here, not only the inactive component is dissolved out, but the platinum metal is also continuously oxidized and reduced in a superficial layer. Due to the site interchange processes of the surface atoms connected therewith, the soluble iron metal atoms become better accessible and are dissolved out faster. In general, the activation process takes longer, however.

In the potentiostatic activation, the inactive component is dissolved out at a potential of between 300 and 800 mV, measured against the reversible hydrogen electrode in the same electrolyte. To accelerate the activation, the electrolyte temperature can be raised to about 80° C. Since with these reaction conditions very large currents occur, this kind of activation takes only a short time.

With the method according to the invention, it is important, as has already been pointed out, that homogeneous alloys are used. Some metals of the VIII subgroup of the periodic system of the elements do form alloys with each other which are homogeneous in the entire range of concentrations and temperatures, e.g., platinum with palladium and rhodium or palladium with nickel and platinum, but the number of combinations of elements which do not form homogeneous alloys in the entire range of concentrations and temperatures is considerably larger. In the systems platinum-iron, platinum-cobalt and platinum-nickel, for instance, homogeneous regions do exist, but below 1300° C. in the case of iron, 800° C. for cobalt and 600° C. for nickel, the PtFe, PtCo and PtNi phases respectively, precipitate with the appropriate composition. Besides, there also exists $Fe_3Pt$ and $Ni_3Pt$ phases. Outside of these regions, the above-mentioned elements can be mixed with each other as desired. In addition, small amounts of other elements, such as titanium, chromium, manganese, niobium, molybdenum, tantalum, tungsten and rhenium, are soluble in platinum metals such as platinum and palladium. Little is known about the ternary state diagrams of the alloys of platinum and iron metals. However, it has been found that homogeneous ternary alloys are produced if the binary combinations of the alloy partners are homogeneously miscible above a temperature characteristic for the system. This is true, for instance, for the systems platinum-palladium-nickel and platinum-rhodium-nickel. To obtain the homogeneous alloys, the melts obtained from the respective metals are chilled and annealed at a temperature of about 1000° C, i.e., at a temperature at which all binary combinations are homogeneous.

The invention will be illustrated further, making reference to three figures and several examples of embodiments of the invention.

A more detailed description of the drawings is discussed below in connection with Examples 1 and 10.

EXAMPLE 1

A platinum-nickel alloy with an atom ratio Pt:Ni of 1:6 was made by melting 1.025 g of platinum and 1.805 g of nickel in an induction furnace at about 1600° C in argon. In order to obtain a fine-grain alloy, which is easier to roll, the melt is chilled. This was achieved by turning off the heat of the induction furnace, whereby its temperature dropped to room temperature within a very short time. The solified alloy was then heated to about 800° C and is rolled at this temperature into a sheet with a thickness of about 400 μm. Thereafter, this sheet was cold-rolled to a thickness of about 100 μm, with heating in between. The foil obtained in this manner is highly elastic and could be bent as desired without breaking. The foil was heat-treated for 80 hours at about 1050° C in an inert atmosphere. Subsequently, a 1-cm$^2$ piece was placed, together with a reversible hydrogen electrode as the reference electrode and a counter-electrode, in a cell for activation in such a manner that only one side came into contact with the electrolytic liquid, and was activated by the potentiodynamic method. For this purpose, the foil was oxidized and reduced periodically and alternatingly in the potential range of between 0 and 1200 mV, as measured against the reversible hydrogen electrode in1 m $H_2SO_4$ as the electrolytic liquid. The inactive component was dissolved out using this process in the range of between 300 and 800 mV. This process was continued at a voltage rate of 0.2 V/min for a period of 120 hours. After this time, the thickness of the active layer of the electrode was about 20 μm, which was formed on the side of the foil in contact with the electrolytic liquid.

Figure 1:
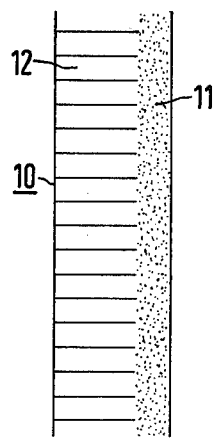
FIG. 1 shows a cross-section of an electrode manufactured by the method according to this invention wherein a catalytically active layer is bonded to one side of a support structure.

Such an electrode is shown schematically in cross-section in FIG. 1. The electrode 10 consists of a catalytically active layer 11, which contains essentially of Raney platinum firmly bonded to one side of a support structure 12 of a Pt-Ni alloy.

Figure 2:
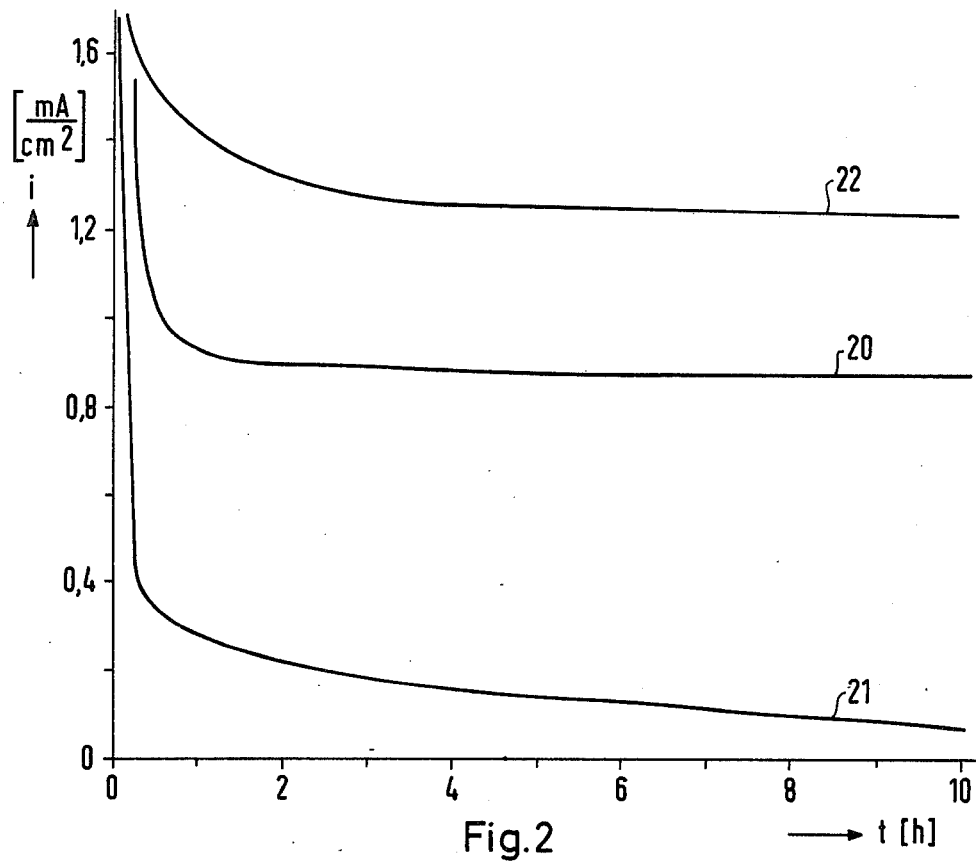
FIG. 2 shows current-vs-time curves for electrodes made according to this invention and a commercially available electrode.

The current-vs-time behavior of the electrode prepared in accordance with Example 1 is shown in FIG. 2 as Curve 20. On the ordinate is plotted the current density $i$ in mA/cm$^2$ and on the abscissa, the time in hours $t[h]$. The current-vs-time curve was recorded in a degassed phosphate buffer solution with a content of 0.1 mol glucose at room temperature and a load potential of 400 mV, measured against the reversible hydrogen electrode. It was found that a constant stationary current value of about 0.9 mA/cm$^2$ develops after about 2 hours. In comparison thereto, the current-vs-time behavior of a commercially available electrode under the same conditions is plotted in Curve 21. This electrode contains active platinum (platinum black) bonded with polytetrafluoroethylene on a tantalum screen; the thickness of the electrode is 155 μm. As Curve 21 shows, the current value of this electrode becomes continuously worse. It drops from a value of about 0.2 mA/cm² after two hours to about 0.1 mA/cm² after 10 hours. Thus, the electrode manufactured by the method according to the invention provides a substantial improvement due to its substantially higher catalytic activity.

EXAMPLE 2

A Pt-W-Ni alloy was melted from 2.472 g of platinum, 1.061 g of WNi₄ and 4.761 g of nickel at about 1600° C; the alloy components were present in the following atom ratios: Pt:W, 5:1 and (Pt+W):Ni, 1:6. This alloy was rolled and annealed to form a foil as described in Example 1. The activation was also performed under the same conditions. As in Example 1, after an activation time of 20 hours, an electrode was obtained whose active catalyst layer of Raney Pt-W was about 15μm.

The current-vs-time curve of this electrode is shown in FIG. 2 as Curve 22. Although the active layer of this electrode is thinner than that of the electrode prepared from pure Raney platinum according to Example 1, a still substantially higher current density, namely, about 1.25 mA/cm², was obtained under the same test conditions.

EXAMPLE 3

An alloy with an atom ratio Pt:Ru:Ni of 0.6 to 0.4 to 6 was melted from 1.171 g of platinum, 0.404 g of ruthenium and 3.522 g of nickel at about 1800° C. After making a foil by the method described in Example 1 and after correspondingly activating it for 120 hours, an electrode with an active layer of Raney Pt-Ru about 10 μm thick was obtained. In spite of the fact that the catalytically active layer was only about half as thick as in the electrode described in Example 1, approximately the same high current density, namely, about 0.8 mA/cm², was obtained in the oxidation of glucose under the same reaction conditions.

EXAMPLE 4

An alloy with a composition corresponding to an atom ratio Pt:Co of 1:4 was prepared from 1.2 g of platinum and 1.45 g of cobalt as per Example 1. A foil prepared therefrom was chemically activated for 15 minutes at about 40° C. in a solution of 20 ml of concentrated HNO₃, 10 ml concentrated H₂SO₄ and 70 ml H₂O. The electrode furnished a current density of about 0.5 mA/cm² in a phosphate buffer solution with 0.1 m glucose, at room temperature.

EXAMPLE 5

From 1 g of platinum, 0.009 g titanium hydride and 1.78 g of nickel, an alloy was prepared as described in Example 1 and was processed into a foil and activated. The electrode having a catalytic layer of about 25 μm thick was built into a cell with 1 m H₂SO₄ as the electrolytic liquid. At a potential of 300 mV a current density of about 1 mA/cm² was obtained in the oxidation of glucose.

EXAMPLE 6

An alloy (atom ratio Pd:Au:Ni of 0.6:0.4:6) was prepared from 0.4 g of palladium, 0.494 g of gold and 2.207 g of nickel, as in Example 1, and was rolled into a foil and annealed. Subsequently, the foil was activated potentiostatically on one side in 1 m H₂SO₄ at 80° C and a potential of 300 mV. A current of about 10 mA/cm² flowed during this. After an activation period of about 1 hour, an active layer about 20 μm thick was obtained. The electrode furnished, at 37° C in a phosphate buffer solution with 0.005 m glucose, a current density of about 0.9 mA/cm².

EXAMPLE 7

An alloy of the composition given in Example 1, after being annealed for 64 hours at about 1050° C, was cast in a casting resin, ground flat and provided with contacts on the back. Subsequently, the activation as described in Example 6 was performed. The electrode, with a catalytic layer about 20 μm thick, furnished a current density of about 25 mA/cm² in 2.5 m H₂SO₄ with 2 m CH₃OH at 70° C and a potential of 350 mV.

EXAMPLE 8

An alloy with a composition corresponding to an atom ratio Pt:Fe of 1:3 was melted from 1.5 g of platinum and 1.288 g of iron at about 1650° C and annealed at about 1050° C. The alloy is cast into a casting resin, ground, provided with contacts and subsequently potentiostatically activated at 80° C. in 1 m HCl at a potential of 300 mV. At the start of the activation the current density was about 20 mA/cm²; and then increased to about 30 mA/cm² where it remained constant. After about 35 minutes, the thickness of the catalytically active layer was about 33 μm. The electrode yielded a current of about 90 mA/cm² in an electrolyte of 6 m KOH and 2 m ethylene glycol at 70° C and a potential of 150 mV. When 1 m H₂SO₄ was used, a current of 150 mA/cm² flows evenly during activation at a potential of 300 mV, so that an active layer with a thickness of about 31 μm is obtained after about 8 minutes.

EXAMPLE 9

From an alloy of platinum, tungsten and nickel, prepared and activated as in Example 2, an electrode was prepared in accordance with Example 7. This electrode, having a thickness of the active layer of about 15 μm, yielded under the same conditions as in Example 7 in 2.5 m H₂SO₄ and 2 m CH₃OH, a current density of about 31 mA/cm². At 400 mV, the current density was as high as 104 mA/cm².

EXAMPLE 10

Onto a platinum foil with a thickness of about 40 μm, a Pt-Ni foil, about 30 μm thick and prepared in accordance with Example 1, was pressed on each side of the foil using a pressure of about 100 N/mm². Subsequently, a sintering operation was performed for about one hour at about 1000° C. The electrode body provided with the alloy layers was then potentiostatically activated at a temperature of about 80° C in 1 m H₂SO₄ at a potential of 700 mV, measured against the reversible hydrogen electrode in the same electrolyte. Neither of the two alloy layers was protected in this process, so that the inactive component was dissolved out from both layers. The activation was completed when the current decreased toward zero, since then the nickel was almost completely dissolved out of the alloy layers. With an electrode prepared in this manner a current density of about 1 mA/cm² under the conditions given in Example 1 was obtained in the oxidation of glucose.

In the oxidation of methanol in sulfuric acid there obtained a current density of about 105 mA/cm² under the reaction conditions given in Example 9 (2 m $CH_3OH$ in 2.5 m $H_2SO_4$, 70° C, 350 mV).

Figure 3:
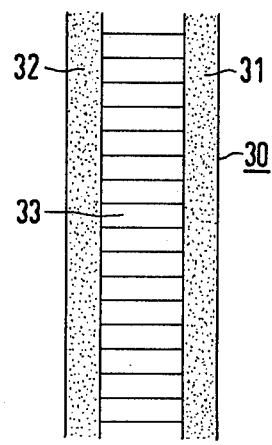
FIG. 3 shows a cross-section of an electrode manufactured according to this invention wherein catalytically active layers are provided on both sides of a metallic support.

An electrode prepared in this manner is shown schematically, in cross-section, in FIG. 3. The electrode 30 has a support structure 33 of platinum, which is provided on both sides with a firmly adhering catalytic layer 31 and 32 of Raney platinum.

EXAMPLE 11

An alloy was prepared from 1 g of platinum, 1.797 g of nickel and 0.02 g of tantalum, and was processed into a foil and activated according to Example 1. The activation took place in the manner described in Example 6. After an activation period of about 1 hour, an active layer with a thickness of about 28 μm was obtained. In the oxidation of glucose, with a load potential of 400 mV (reaction conditions as in Example 1) a constant current density of about 1 mA/cm² was obtained after about 30 hours.

As previously discussed, the galvanostatic method can also be used for the activation, besides the potentiostatic and the potentiodynamic method. The galvanostatic method can be carried out, for instance, in such a manner that the electrode is anodically loaded for about 20 hours with 0.2 mA/cm². Subsequently, a cathodic load of 0.2 mA/cm² is briefly applied further, in order to reduce the partially oxidized platinum metal. Under the conditions, the active layer formed from a Pt-Ni alloy, for instance, is about 6 to 7 μm.

As has already been shown in Examples 7 to 10, the electrodes prepared in accordance with the method of this invention can be used, in addition for the oxidation of glucose, also for the oxidation of other fuels, e.g., for the oxidation of methanol and ethylene glycol. These electrodes can therefore be used not only as anodes in bio-fuel cells, but also in conventional fuel cells, for instance, in methanol-air fuel cells. In addition, the electrodes made by the method according to the invention can be used for the electrochemical reduction of oxygen, particularly in fuel cells with an acid electrolyte.

What is claimed is:

1. A method for the manufacture of an electrode for an electrochemical cell comprising a Raney-noble metal catalytic layer disposed on a metallic support structure in layer form; wherein the method comprises the steps of:
    (a) forming a layer disposed on said metallic support structure in layer form of a homogenous alloy of an active component comprising at least one of the metals of the platinum group of the Periodic System and an inactive component comprising at least one of the iron group metals of the Periodic System, wherein the content of said inactive component is at least 65 atom-percent of said alloy; and
    (b) dissolving out the inactive component from said alloy,
said forming comprising rolling said homogenous alloy into a thin foil, said alloy also constituting said metallic support structure, and dissolving out said iron group metal from at least one side of said foil superficially and maximally to a depth of 50 μm.

2. The method of claim 1 wherein the content of said inactive component is from about 75 to 90 atom-percent.

3. The method of claim 1 wherein said homogeneous alloy is a platinum-nickel alloy.

4. The method of claim 1 wherein said platinum-group metal is replaced with from 1 to 5 atom-percent of at least one of the elements selected from the group consisting of boron, silicon, titanium, zirconium, niobium and tantalum.

5. The method of claim 4 wherein said platinum group metal is replaced with about 3 atom-percent of said element.

6. The method of claim 1 wherein said platinum group metal is replaced with from 5 to 20 atom-percent of an element selected from the group consisting of molybdenum, tungsten and mixtures thereof.

7. The method of claim 6 wherein said platinum group metal is replaced with about 15 atom-percent of said element.

8. The method of claim 6 wherein said homogenous alloy is a platinum-tungsten-nickel alloy.

9. The method of claim 1 wherein said platinum group metal is replaced with from 10 to 60 atom-percent of an element selected from the group consisting of copper, gold, and mixtures thereof.

10. The method of claim 9 wherein said platinum group metal is replaced with about 40 atom-percent of said element.

11. The method of claim 1 wherein the inactive component is dissolved out electrochemically.

12. The method of claim 11, wherein the inactive component is dissolved out potentiostatically at a potential of between 300 and 800 mV as measured against the reversible-hydrogen electrode.

13. The method of claim 11 wherein the inactive component is dissolved out potentiodynamically in the potential range of between 0 and 1200 mV, as measured against the reversible hydrogen electrode.

14. A method for the manufacture of an electrode for an electrochemical cell comprising a Raney-noble metal catalytic layer on a metallic support structure in layer form; wherein the method comprises the steps of:
    (a) forming a layer disposed on said metallic support structure in layer form of a homogenous alloy of an active component comprising at least one of the metals of the platinum group of the Periodic System and an inactive component comprising at least one of the iron group metals of the Periodic System, wherein the content of said inactive component is at least 65 atom-percent of said alloy; and
    (b) dissolving out the inactive component from said alloy,
wherein said metal support structure in layer form is a platinum layer and wherein a foil consisting of said homogeneous alloy is placed on said platinum support layer by sintering or welding.

15. A method for producing an electrode for an electrochemical cell having a thickness of 0.1 mm or less comprising:
    (a) forming a thin foil of a homogeneous alloy of an active component comprising at least one of the metals of the platinum group of the Periodic System and an inactive component comprising at least one of the iron group metals of the Periodic System, wherein the content of said inactive component is at least 65 atom-percent of said alloy; and
    (b) dissolving out said iron group metal potentiostatically from at least one side of said foil to form an electrode having a thickness of 0.1 mm or less.

16. The method of claim 15 wherein said alloy is a platinum-nickel alloy.

17. The method of claim 15 wherein said platinum group metal is replaced with from 5 to 20 atom-percent of tungsten.

18. A method for producing an electrode for an electrochemical cell having a thickness of 0.1 mm or less comprising:
(a) placing a foil of a homogeneous alloy of an active component comprising at least one of the metals of the platinum group of the Periodic System and an inactive component comprising at least one of the iron group metals of the Periodic System on a platinum support layer wherein the content of said inactive component is at least 65 atom-percent of said alloy; and
(b) dissolving out said iron group metal potentiostatically to form an electrode having a thickness of 0.1 mm or less.

19. The method of claim 18 wherein said alloy is a platinum-nickel alloy.

20. The method of claim 18 wherein said platinum group metal is replaced with from 5 to 20 atom-percent of tungsten.